United States Patent Office 2,956,911
Patented Oct. 18, 1960

2,956,911

SEPARATION OF COATINGS FROM METAL SURFACES

Frederic C. Jelen, Syracuse, N.Y., assignor to Allied Chemical Corporation, a corporation of New York No Drawing. Filed Mar. 29, 1956, Ser. No. 574,620

8 Claims. (Cl. 134—22)

This invention relates to a method of removing coatings or linings from metal surfaces clad with the same. More specifically, it relates to a method of breaking the bond between a metal surface and a lining of chemically resistant synthetic elastomer or rubber-like material, for example, neoprene, deposited thereon.

Protective linings have heretofore been applied to various materials to permit them to be employed under a wide variety of conditions for which they are otherwise unsatisfactory. Metals in particular have been protected by applied linings to render them less susceptible to corrosion. Linings employed in metal conduits and vessels, e.g. tanks or tank cars, have permitted wide extension of the permissible uses of these vessels made from ordinary steel, for example. Such linings, typically of chemically resistant substance typified by neoprene and other rubbers chemically inert with respect to vessel contents, typified by Buna rubber, GRS rubber, and the like, permit extended life of the corrodable metal shell and prevent contamination of fluids by products of metal corrosion.

When a tank, the inside of which has been lined with protective coating, has been used for an extended period of time, it tends to become defective (i.e. scuffed, gouged, penetrated) by reason of mechanical damage. It is then desirable to remove the lining preparatory to replacement of the same.

Because of the resistance of satisfactory lining or cladding rubber-like substances to the action of chemicals and solvents which do not attack the protected metal, for example, mild steel, removal of the lining has represented a time-consuming and expensive procedure, entailing excessive labor, high temperatures, or costly procedures to prevent loss or to effect recovery of costly agents. Among the methods employed, none of which has been economically satisfactory, are: subjecting the lining to the deteriorative action of strong reagents, to the destructive results of high temperature, to the erosive effect of sand blasting or scraping, or to the solvent action of a wide variety of solvents. When solvents have been employed, it has often taken extended periods of a day or longer to obtain satisfactory removal of coatings or linings. Furthermore, the solvents employed have been, in many cases, highly volatile, which occasioned other, often inadequate, efforts to minimize losses by evaporation. Use of solvents for the lining material involves ancillary purification of used solvent, or, if purification is not economically feasible, its rejection.

It is an object of this invention to effect separation of chemically resistant rubber linings from metal surfaces clad therewith in sheet, substantially undissolved and otherwise easily handleable form. Other objects will be apparent to those skilled in the art on inspection of the following description.

This invention comprises treatment of chemically resistant synthetic rubber-lined or clad surfaces at temperature of at least about 80° C. with the vapors and condensate of a chlorinated aromatic and preferably mononuclear hydrocarbon in which the rubber lining material is insoluble or substantially so. Temperature employed is below that at which the particular rubber cladding is subject to substantial thermal deterioration. Although higher temperatures may be used effectively with highly thermally resistant rubbers, it is usually not necessary to employ temperatures above about 220° C. and in most instances above about 190° C. In the interests of speedy removal of the lining material, it is preferred to use temperatures of at least about 110° C.

In practice of the invention vapors of the chlorinated aromatic hydrocarbon are generated in any suitable vaporizer and brought into contact with the rubber-clad surface which is maintained at temperature at which the vapors condense. The generated vapors appear to penetrate the cladding or lining and in condensed form attack and destroy the bond between the metal and rubber. In any event, after the contact has been maintained for a suitable period, usually not more than a few hours, the cladding or lining rubber completely separates from the supporting metal and sloughs off in sheets. Very little, if any, cladding material is dissolved in the chlorinated aromatic compound, permitting its reuse many times without subjecting it to purification or reclamation procedure.

Additionally, the separated rubber cladding is removed from the site, for discard or reclamation, simply by picking up or shoveling or pushing away the separated sheets of rubber. The exposed metal surfaces are clean and ordinarily require no further treatment, except permissibly steaming to remove residual chlorinated aromatic compound, before preparation to receive a replacement layer of rubber.

When it is desired to vaporize the chlorinated aromatic compound a temperature below its boiling point it may be vaporized by open steam or while containing water to depress normal vaporization temperature. Optionally, the water may be present as a solution of a salt such as calcium chloride which at vaporization temperature is inert with respect to the rubber coating.

Desired temperatures of the metal at which the chlorinated aromatic compound is in condensed form and below decomposition temperature of the rubber, for example, within the above indicated limits, may be maintained by natural convection to ambient atmosphere or with the aid of moving air or of sprayed or circulating cooling liquid such as water. Use of a condenser for the vaporized compound so located as to form and drain condensate onto the clad surface is a convenient way of aiding in maintenance of such temperature.

Although the process of the invention is applicable to rubber-clad objects of any desired size and shape, it lends itself readily to internally clad conduits or closed or closable containers such as reaction vessels and tanks, for example, tank cars. In this application to such a container, the chlorinated aromatic compound is conveniently placed within it in quantity sufficient to generate vapor filling the car, and then boiled or vaporized by means of heating elements or open steam fittings either normally present within the container or supplied for that purpose. Vaporization is maintained at rate adequate to keep the container always full of vapor until the rubber cladding separates and falls in sheets. Desired condensation at the treated surface is ordinarily obtained by normal convection losses of the container to ambient atmosphere. In control of the operation it is preferred to connect an upper vapor outlet of the container to a refluxing condenser and to generate vapor at such rate that there is a small return from the condenser into the vessel where the condenser is run at temperature which permits passage of substantially no vapor therethrough.

Maintenance of the container wall or other rubber-clad surfaces in contact with condensate and vapor for a period of four hours is often adequate to effect complete separation of the cladding material even when it is made of the highly chemically-resistant "neoprene" (a trademark of E. I. du Pont de Nemours & Company designating a synthetic rubber formed by polymerization of chloroprene, 2-chlorobutadiene-1,3). Longer or shorter periods of time from say 1 to 24 hours may, however, be employed, depending upon the thickness of the rubber layer to be removed, the temperature of the surface, and the particular nature of the rubber layer and of the chlorinated aromatic compound. The required times, which only rarely exceed four hours, particularly at preferred conditions of temperature, tend to be shorter with Buna and GRS rubbers than with neoprene.

Although not necessary for the separation of the rubber layer, it is preferred, due to the toxicity and irritant effect of chlorinated aromatic compounds, to follow the vapor-condensate contacting step with a steaming operation to remove residual quantities of this substance in view of subsequent handling of the decladded object. When that object is a container, this may be easily obtained by a slow atmospheric pressure steam flushing for periods of up to about twenty-four hours.

The preferred classes of compounds used in practice of the invention are chlorinated mononuclear aromatic compounds boiling up to about 220° C. containing one to three chlorine substituents. The benzene ring may be substituted by one to two alkyl radicals containing one to two carbon atoms, preferably the methyl radical. Preferred specific compounds within that class and their boiling points are as follows:

| Compound: | Boiling point, ° C. |
|---|---|
| Chlorobenzene | 132 |
| O-dichlorobenzene | 180 |
| M-dichlorobenzene | 172 |
| P-dichlorobenzene | 173 |
| 1,2,4-trichlorobenzene | 213 |
| O-chlorotoluene | 159 |
| M-chlorotoluene | 162 |
| P-chlorotoluene | 162 |

The compound giving most satisfactory performance with synthetic rubber layers generally, including those of neoprene, Buna, Buna S, and GRS rubbers, is orthodichlorobenzene.

According to one specific embodiment of this process, a 10,000 gallon tank car, equipped with steam heating coils, was treated to remove the lining therefrom. Originally the inside of this tank had been given a prime coat of a chlorinated rubber-base paint. A film of neoprene, approximately 20 mils thickness, had been deposited thereon as a water emulsion which matured or hardened into a chemically resistant liquid impermeable protective membrane. After an extended period of use in handling caustic soda solutions, the lining had become damaged mechanically. In particular, it had separated from the prime coat in places; it had been physically penetrated in others; it had abraded in spots to such an extent that there was contact between exposed metal and the contents of the vessel.

Orthodichlorobenzene, recovered from previous similar operations and containing trace to very small amounts of water and other impurities, was placed within the tank car in amount (one thousand gallons) sufficient to cover the heating coils in the bottom thereof.

An air condenser was fitted onto the dome of the car. This condenser included a flat plate, bolted to the manhole of the car, bearing a pair of open-ended finned radiator pipes sloping downwardly toward the car.

Steam at about 150 p.s.i.g. was passed through the heating coils until the orthodichlorobenzene boiled at about 180° C. and the car was filled with vapor under slight reflux from the air condenser. The loss of heat from the tank walls to the atmosphere by natural convection permitted condensation of the orthodichlorobenzene vapor on the walls thereof.

At the end of four hours, the stream flow was stopped and the tank car permitted to cool. The orthodichlorobenzene was drained therefrom and passed to storage. The tank was then steamed out for twenty-four hours with a slow flow of open steam to remove last traces of orthodichlorobenzene. When the car cooled, an operator entered the tank, and found that the lining had loosened itself from the wall of the tank, and had completely sloughed off in sheets. Furthermore, the prime coat had also been substantially removed from the tank wall. The loose lining was readily removed from the tank by shoveling, which was ready for preparation for a new lining such as sand-blasting of the surface to remove incidental surface defects.

According to a second embodiment of this invention, a similar tank car lined with "Duroprene" (a trademark of Electro Chemical Engineering and Mfg. Co. indicating a solvent-type coating formulation of a synthetic rubber formed by polymerization of chloroprene) was contacted, according to the details set forth in connection with the above example, with orthodichlorobenzene vapor and condensate during two one-half hour periods, separated by about a four hour cooling period, and was then steamed out. Removal of the Duroprene lining was found to be as complete as heretofore described for the neoprene lining. The Duroprene was bonded to the car metal with a chlorinated rubber primer.

It will be apparent to those skilled in the art that various modifications may be made in the preferred embodiments hereinbefore described, which fall within the scope of this invention. For instance, it is not necessary to successful practice of the invention that the rubber cladding be bonded to the metal by the prime or bonding coating indicated in the foregoing examples. Effective and clean separation of the rubber cladding layer in sheet form is realized when it is bonded to the metal by a material containing as its main ingredient a chemically resistant synthetic rubber which is itself insoluble in the chlorinated aromatic compound employed. In fact, the invention produces satisfactory results when there is no bonding layer containing cementitious material different from the chemically resistant content of the cladding rubber, as may be obtained by spraying a solution of the latter rubber on properly prepared metal surface followed by evaporation of the solvent. The combined effect of the vapor and condensate of the chlorinated aromatic non-solvent used in practice of the invention appears to be the establishment of stresses between the rubber cladding material and the underlying surface which effect a clean fracture or separation at the plane of juncture.

I claim as my invention:

1. The method of separating a chemically resistant layer of synthetic rubber from a metal surface to which it is bonded comprising contacting the layer with vapor and condensate of an organic chlorinated aromatic compound in which said rubber is substantially insoluble at a temperature of at least about 80° C. and below the temperature at which said rubber decomposes until the layer thereof separates from said metal surface in sheet form.

2. The method of separating a chemically resistant layer of synthetic rubber from a metal surface to which it is bonded comprising contacting the layer with vapor and condensate of an organic chlorinated aromatic compound which is a chlorine substituted mononuclear aromatic compound containing one to three chlorine substituents in the aromatic ring in which said rubber is substantially insoluble, at a temperature of at least about 80° C. and below the temperature at which said rubber decomposes, until the layer thereof separates from said metal surface in sheet form.

3. The method of separating a chemically resistant layer of synthetic rubber from a metal surface to which it is bonded comprising contacting the layer with vapor and condensate of an organic chlorinated mononuclear aromatic compound containing one to three chlorine and one to two alkyl radical substituents of one to two carbon atoms in the aromatic ring in which said rubber is substantially insoluble, at a temperature of at least about 80° C. and below the temperature at which said rubber decomposes, until the layer thereof separates from said metal surface in sheet form.

4. The method of separating a chemically resistant layer of synthetic rubber from a metal surface to which it is bonded comprising contacting the layer with vapor and condensate of an organic chlorinated aromatic compound selected from the group consisting of chlorobenzene, o-dichlorobenzene, m-dichlorobenzene, p-dichlorobenzene, 1,2,4-trichlorobenzene, o-chlorotoluene, m-chlorotoluene, and p-chlorotoluene at a temperature of at least about 80° C. and below the temperature at which said rubber decomposes until the layer thereof separates from said metal surface in sheet form.

5. The method of separating a chemically resistant layer of synthetic rubber from a metal surface to which it is bonded comprising contacting the layer with vapor and condensate of orthodichlorobenzene at a temperature of at least about 80° C. and below the temperature at which said rubber decomposes until the layer thereof separates from said metal surface in sheet form.

6. The method of separating a chemically resistant layer of synthetic rubber from a metal surface to which it is bonded comprising producing vapors of an organic chlorinated aromatic compound in which said rubber is substantially insoluble, at a temperature above about 110° C. and below the temperature at which said rubber decomposes, and contacting said layer of rubber with said vapors while maintaining said metal at a temperature at which said compound condenses until said layer separates from the metal in sheet form.

7. The method of separating a chemically resistant liner of synthetic rubber at a temperature below decomposition temperature of said rubber from the shell of a metal container comprising filling said container with vapor comprising a chlorine substituted mononuclear compound selected from the group consisting of chlorobenzene, o-dichlorobenzene, m-dichlorobenzene, p-dichlorobenzene, 1,2,4-trichlorobenzene, o-chlorotoluene, m-chlorotoluene, and p-chlorotoluene, and maintaining said shell at a temperature at which said compound condenses until said linear separates from said shell in sheet form.

8. The method of separating a chemically resistant liner of synthetic rubber at a temperature below decomposition temperature of said rubber from the shell of a metal container comprising filling said container with vapor comprising orthodichlorobenzene, and maintaining said shell at a temperature at which said vapor condenses until said liner separates from said shell in sheet form.

References Cited in the file of this patent

UNITED STATES PATENTS

| | | |
|---|---|---|
| 2,406,458 | Gerndt et al. | Aug. 27, 1946 |
| 2,417,468 | Canziani et al. | Mar. 18, 1947 |
| 2,571,328 | Baker | Oct. 16, 1951 |
| 2,637,670 | Brown et al. | May 5, 1953 |
| 2,662,837 | Duncan | Dec. 15, 1953 |
| 2,755,209 | Duncan | July 17, 1956 |
| 2,852,471 | Atkins et al. | Sept. 16, 1958 |

FOREIGN PATENTS

| | | |
|---|---|---|
| 556,635 | Great Britain | Oct. 14, 1943 |

OTHER REFERENCES

Industrial Solvents, Mellon, 2nd ed., 1950, pp. 363–366.